United States Patent [19]

Aihara et al.

[11] 4,309,321

[45] Jan. 5, 1982

[54] AQUEOUS COATING COMPOSITION

[75] Inventors: Tetsuo Aihara; Yasuharu Nakayama; Yoshio Yamashita, all of Hiratsuka, Japan

[73] Assignee: Kansai Paint Co., Ltd., Japan

[21] Appl. No.: 117,511

[22] Filed: Aug. 12, 1980

[30] Foreign Application Priority Data

Aug. 17, 1979 [JP] Japan .................................. 54-103981

[51] Int. Cl.$^3$ .............................................. C08L 33/02
[52] U.S. Cl. ........................... 260/23 CP; 260/22 CB; 260/23 ST; 260/23 EP; 260/23.7 A
[58] Field of Search ......... 260/23 AR, 23 CP, 23 ST, 260/23.7 A, 29.6 NR, 29.6 RW, 29.7 UA, 29.7 D, 29.7 W, 29.7 RP; 526/320, 322

[56] References Cited

U.S. PATENT DOCUMENTS

| | | | |
|---|---|---|---|
| 3,251,790 | 5/1966 | Christenson | 260/23 AR |
| 3,486,930 | 12/1969 | Antlfinger | 260/29.6 RW |
| 3,919,146 | 11/1975 | Emmons | 260/23 CP |
| 3,988,273 | 10/1976 | Tetsuo | 260/29.6 TA |
| 3,993,612 | 11/1976 | Aihara | 260/29.6 RW |
| 4,072,536 | 2/1978 | Otsuki | 260/23.7 A |
| 4,073,758 | 2/1978 | Nakayama | 260/23.7 A |
| 4,075,135 | 2/1978 | Jozwiak | 260/29.7 DP |
| 4,122,052 | 10/1978 | Aihara | 260/23 AR |
| 4,129,537 | 12/1978 | Dhein | 260/23 ST |
| 4,146,519 | 3/1979 | Dhein | 260/23 AR |
| 4,199,487 | 4/1980 | Nakayama | 260/23.7 A |

*Primary Examiner*—Paul R. Michl
*Attorney, Agent, or Firm*—Wenderoth, Lind & Ponack

[57] ABSTRACT

An aqueous coating composition comprising as film-forming components

[I] a water-soluble or water-dispersible product of a resin (i) obtained by copolymerizing (A) a fatty acid-modified acrylic monomer composed of the reaction product between an unsaturated fatty acid having at least two non-conjugated double bonds and a hydroxyl-containing ester of acrylic or methacrylic acid, (B) an $\alpha,\beta$-ethylenically unsaturated carboxylic acid, and (C) an unsaturated monomer having a Q value in the Q-e theory of at least 0.1, and

[II] a vinyl polymer emulsion obtained by polymerizing an unsaturated vinyl monomer in the presence of a water-soluble oxidation-curable resin (ii) as a dispersion stabilizer.

27 Claims, No Drawings

AQUEOUS COATING COMPOSITION

This invention relates to a novel aqueous coating composition, and more specifically to a water-soluble or water-dispersible coating composition which is useful as an air-drying coating composition.

Some air-drying aqueous coating compositions have been known in the past, and an alkyd resin is cited as a typical water-soluble resin used in these compositions. Since the water-soluble alkyd resin contains many ester linkages in the main chain, it readily undergoes hydrolysis when kept in the form of an aqueous solution, particularly an aqueous solution neutralized with a base. Accordingly, water-soluble coating compositions containing alkyd resins have the serious defect that they generally have poor storage stability, and coated films formed therefrom have poor fundamental film properties such as poor water resistance, alkali resistance and weatherability.

To remove the defect of the alkyd resin, the present invention endeavored to develop a water-soluble or water-dispersible resin which does not contain hydrolysis-susceptible ester linkages in the main chain and can be cured at room temperature. This effort led to the discovery that a water-soluble or water-dispersible resin obtained by copolymerizing a fatty acid-modified monomer (obtained by reacting an unsaturated fatty acid having a non-conjugated double bond with a glycidyl ester of an $\alpha,\beta$-ethylenically unsaturated acid) with an $\alpha,\beta$-ethylenically unsaturated acid and an unsaturated monomer having a Q value in the Q-e theory of at least 0.1 and neutralizing the resulting resin with a base such as ammonia, an amine or an alkali metal is very suitable as a resin component in air-drying aqueous coating compositions. This resin component was proposed in U.S. Pat. No. 3,988,273.

Furthermore, the present inventors previously invented a vinyl polymer emulsion containing maleinized polybutadiene as a dispersion stabilizer, and proposed it in Japanese Patent Publication No. 13192/76. This vinyl polymer emulsion has a fast rate of curing at room temperature and superior water resistance and alkali resistance. However, since it has the property of forming a porous film inherent to an emulsion, the coated film formed from the vinyl polymer emulsion does not have entirely satisfactory corrosion resistance, salt water resistance, weatherability and gloss. Thus, the present inventors continued their investigations in order to remedy the aforesaid defect of the vinyl polymer emulsion without impairing its excellent properties. These investigations led to the discovery that the aforesaid water-soluble or water-dispersible resin is very compatible with the vinyl polymer emulsion, and a coated film prepared from a composition consisting of a mixture of the two has better properties than the film of the vinyl polymer emulsion and improved corrosion resistance, weatherability and gloss. Based on this finding, the present inventors previously suggested an aqueous coating composition comprising the aforesaid water-soluble or water-dispersible resin, and the vinyl polymer emulsion containing maleinized polybutadiene as a dispersion stabilizer (see U.S. Pat. No. 3,993,612).

Since, however, the glycidyl ester of an $\alpha,\beta$-ethylenically unsaturated acid, such as glycidyl acrylate or glycidyl methacrylate, used as a starting material in the preparation of the aforesaid water-soluble or water-dispersible resin is expensive, and it is desired to develop inexpensive materials which can replace it. A coated film formed from the aqueous coating composition containing the aforesaid water-soluble or water-dispersible resin has the defect of poor water resistance in the imperfectly dried state although when it has been completely dried up, no problem arises. For example, when an imperfectly dried coating is exposed to rainfall outdoors for even a day, it becomes whitened. For practical application, this defect should be remedied.

The present inventors extensively worked to improve the water resistance of a half-dried coated film prepared from the aforesaid coating composition. As a result, they ascertained that the poor water resistance of such a film is due to the fact that a secondary hydroxyl group necessarily formed in the fatty acid-modified monomer by the reaction of the glycidyl ester of an $\alpha,\beta$-ethylenically unsaturated acid with the unsaturated fatty acid having a non-conjugated double bond is introduced into the resulting copolymeric resin. Thus, they furthered their work in order to produce an air-drying water-soluble or water-dispersible resin having the aforesaid excellent properties without using the glycidyl ester of an $\alpha,\beta$-ethylenically unsaturated acid. Consequently, they took up a hydroxyl-containing ester of acrylic or methacrylic acid as a possible substitute for the glycol ester of an $\alpha,\beta$-ethylenically unsaturated acid. They have specifically found that a fatty acid-modified acrylic monomer obtained by reacting the hydroxyl-containing ester of acrylic or methacrylic acid with an unsaturated fatty acid having at least two non-conjugated double bonds does not have the defects associated with the use of the aforesaid glycidyl ester; that a resin obtained by copolymerizing this fatty acid-modified acrylic monomer with an $\alpha,\beta$-unsaturated carboxylic acid and an unsaturated monomer having a Q value in the Q-e theory of at least 0.1 gives a coated film being fast drying and having excellent water resistance in a half-dried condition; and that this copolymeric resin is compatible well not only with the vinyl polymer emulsion containing maleinized polybutadiene as a dispersion stabilizer but also with vinyl polymer emulsions containing water-soluble oxidation-curable resins other than maleinized polybutadiene as a dispersion stabilizer, and the properties of a coated film prepared from an aqueous coating composition containing the two together are much better than those of coated films obtained from the resin component and the emulsion component separately.

Thus, in accordance with this invention, there is provided an aqueous coating composition comprising as film-forming components

[I] a water-soluble or water-dispersible product of a resin obtained by a copolymerizing (A) a fatty acid-modified acrylic monomer composed of the reaction product between an unsaturated fatty acid having at least two non-conjugated double bonds and a hydroxyl-containing ester of acrylic or methacrylic acid, (B) an $\alpha,\beta$-ethylenically unsaturated carboxylic acid, and (C) an unsaturated monomer having a Q value in the Q-e theory of at least 0.1, and

[II] a vinyl polymer emulsion obtained by polymerizing an unsaturated vinyl monomer in the presence of a water-soluble oxidation-curable resin as a dispersion stabilizer.

The "Q-e theory", as used in the present specification and appended claims, is a theory of the constant of the velocity of addition reaction of a monomer with a radical, which was advocated by T. Alfrey and C. Price in 1947 in order to deal with the radical polymerization or copolymerization of vinyl compounds systematically [see J. Polymer Sci., 2, 101 (1947)]. It expresses the reactivity ratio of monomers in radical polymerization or copolymerization as the function of the resonance stability of the radical and the polar effect of the monomers. The "Q value" represents the degree of the resonance stability, and the "e value" is a measure of a relative charge on the double bond. Generally, styrene is taken as a standard, and is supposed to have a Q value of 1.00 and an e value of $-0.80$. From the results of copolymerization, the Q and e values of other monomers are determined.

The components of the aqueous coating composition of this invention are described in more detail below.

Water-soluble or water-dispersible product of a resin [I]

(A) Fatty acid-modified acrylic monomer

The unsaturated fatty acid used to obtain the fatty acid-modified acrylic monomer (A) in this invention is an unsaturated fatty acid, particularly an unsaturated linear or branched aliphatic monocarboxylic acid, containing at least two double bonds per molecule, the double bonds being not conjugated with each other. Suitable fatty acids are those which generally have 10 to 24 carbon atoms, preferably 14 to 20 carbon atoms, and an iodine value of at least 80, preferably at least 100. Drying oil fatty acids and semidrying oil fatty acids having at least two non-conjugated double bonds prove to be especially effective.

The drying oil fatty acids and semidrying oil fatty acids cannot be strictly defined, but generally denote monobasic acids derived from animal and vegetable oils and fats. The drying oil fatty acids generally denote unsaturated fatty acids having an iodine value of at least 130, and the semidrying oil fatty acids generally denote unsaturated fatty acids having an iodine value of 100 to 130. Typical examples of unsaturated fatty acids include safflower oil fatty acid, linseed oil fatty acid, soybean oil fatty acid, sesame oil fatty acid, poppy oil fatty acid, perilla oil fatty acid, hemp seed oil fatty acid, grape kernel oil fatty acid, corn oil fatty acid, tall oil fatty acid, sunflower fatty acid, cotton seed oil fatty acid, walnut oil fatty acid, and rubber seed oil fatty acid. These fatty acids can be used either singly or in combination with each other.

The amount of the unsaturated fatty acid used can be varied widely depending upon the drying property or film properties required of the aqueous coating composition provided by the present invention. Generally, the advantageous amount is 5 to 65% by weight, preferably 10 to 60% by weight, based on the weight of the copolymer obtained.

In addition of the aforesaid unsaturated fatty acid containing non-conjugated double bonds, there may be used a small amount, preferably not more than 30% by weight, more preferably not more than 20% by weight, based on the total weight of the unsaturated fatty acids, of another unsaturated fatty acid containing conjugated double bonds, such as tung oil fatty acid, oiticica oil fatty acid, dehydrated castor oil fatty acid or Hidiene fatty acid (a trademark for a conjugated fatty acid made by Soken Kagaku Co., Ltd., Japan).

The hydroxyl-containing acrylic or methacrylic ester (to be sometimes referred to as a hydroxyl-containing acrylic-type ester) to be reacted with the aforesaid unsaturated fatty acid for production of the fatty acid-modified acrylic monomer (A) includes those in which the ester residue moiety has one hydroxyl group and 2 to 24, preferably 2 to 8, carbon atoms. Suitable hydroxyl-containing acrylic-type esters are those of the following formula (I) or (II)

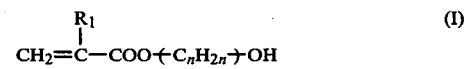

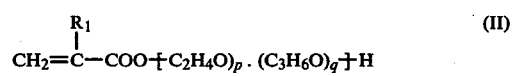

wherein $R_1$ represents a hydrogen atom or a methyl group, n is an integer of 2 to 8, and p and q each represent zero or an integer of 1 to 8 provided that the sum of p and q is 1 to 8.

Preferred hydroxyl-containing acrylic-type esters for use in this invention are hydroxyalkyl acrylates and hydroxyalkyl methacrylates of formula (I), above all 2-hydroxyethyl acrylate, 2-hydroxyethyl methacrylate, 2-hydroxypropyl acrylate and 2-hydroxy-propyl methacrylate.

The fatty acid-modified acrylic monomer (A) can be prepared usually by reacting the unsaturated fatty acid with the hydroxyl-containing acrylic-type ester in the presence of an esterification catalyst, optionally in an inert solvent. The reaction is carried out at a temperature of generally about 100° to about 180° C., preferably about 120° to about 160° C., for a period of generally about 0.5 to about 9 hours, usually for about 1 to about 6 hours.

The amount of the hydroxyl-containing acrylic type ester is usually 0.5 to 1.9 moles, preferably 1.0 to 1.5 moles, per mole of the unsaturated fatty acid.

Examples of the esterification catalysts used in the aforesaid reaction are sulfuric acid, aluminum sulfate, potassium hydrogen sulfate, p-toluenesulfonic acid, hydrochloric acid, methyl sulfate and phosphoric acid. The catalyst is used generally in an amount of about 0.001 to about 2.0% by weight, preferably about 0.05 to about 1.0% by weight, based on the total amount of the unsaturated fatty acid and the hydroxyl-containing acrylic-type ester.

The inert solvent optionally used is preferably a water-immiscible organic solvent which can be refluxed at a temperature of 180° C. or below, and includes, for example, aromatic hydrocarbons such as benzene, toluene and xylene, and aliphatic hydrocarbons such as heptane, hexane and octane.

Advantageously, polymerization of the hydroxyl-containing acrylic-type ester and the resulting fatty acid-modified acrylic ester is inhibited by adding a polymerization inhibitor such as hydroquinone, methoxyphenol, tert-butyl catechol or benzoquinone to the reaction system as required.

In the above reaction, esterification takes place between the hydroxyl group of the hydroxyl-containing acrylic-type ester and the carboxyl group of the unsaturated fatty acid.

The fatty acid-modified acrylic monomer (A) can consist substantially of the resulting acrylic-type ester in which the unsaturated fatty acid has been introduced by esterification. It may contain some amount of the unreacted unsaturated fatty acid or hydroxyl-containing acrylic-type ester. The amount of the unreacted unsaturated fatty acid should be restricted to not more than 40% by weight, preferably not more than 10% by weight, based on the total amount of the monomer (A), and the amount of the hydroxyl-containing acrylic-type ester should be restricted to not more than 37% by weight, preferably not more than 15% by weight, based on the total weight of the monomer (A).

The resulting fatty acid-modified acrylic monomer (A) may have an acid value of generally not more than 80, preferably not more than 20.

(B) $\alpha,\beta$-Ethylenically unsaturated carboxylic acid

The $\alpha,\beta$-ethylenically unsaturated carboxylic acid (B) is an unsaturated aliphatic mono- or poly-carboxylic acid having an addition-polymerizable double bond between the carbon atom to which the carboxyl group is attached and a carbon atom located adjacent thereto. Suitable $\alpha,\beta$-ethylenically unsaturated carboxylic acids are those containing 3 to 8 carbon atoms, particularly 3 to 5 carbon atoms, and 1 or 2 carboxyl groups, and include those of the following general formula

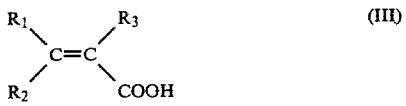

wherein $R_1$ represents a hydrogen atom or a lower alkyl group, $R_2$ represents a hydrogen atom, a lower alkyl group or a carboxyl group, and $R_3$ represents a hydrogen atom, a lower alkyl group or a carboxy-lower alkyl group provided that when $R_2$ represents a carboxyl group, $R_3$ does not represent a carboxy-lower alkyl group.

In formula (III), the term "lower alkyl group" denotes an alkyl group having not more than 4 carbon atoms, preferably a methyl group.

It should be understood that the term "$\alpha,\beta$-ethylenically unsaturated carboxylic acid", used in the present specification and claims, also embraces an anhydride of an $\alpha,\beta$-ethylenically unsaturated polycarboxylic acid with two or more carboxyl groups.

Specific examples of such an $\alpha,\beta$-ethylenically unsaturated carboxylic acid include acrylic acid, methacrylic acid, crotonic acid, itaconic acid, maleic acid, maleic anhydride and fumaric acid. Acrylic acid and methacrylic acid are preferred. These carboxylic acids may be used singly or in combination with each other.

(C) Unsaturated monomer

There is no particular restriction on the unsaturated monomer (C) having a Q value, determined by the Q-e theory, of at least 0.1, and it can be selected widely according to the properties required of an aqueous coating composition as a final product. Generally, unsaturated monomers having a Q value of 0.1 to 5 are suitable.

Typical examples of the unsaturated monomer (C) are listed below.

(a) Acrylic or methacrylic esters $C_1-C_{18}$ alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2-C_{12}$ alkoxyalkyl esters of acrylic or methacrylic acid, such as methoxybutyl acrylate, methoxybutyl methacrylate, methoxyethyl acrylate, methoxyethyl methacrylate, ethoxybutyl acrylate and ethoxybutyl methacrylate; allyl acrylate and allyl methacrylate; $C_2-C_8$ hydroxyalkyl esters of acrylic or methacrylic acid, such as hydroxyethyl acrylate, hydroxyethyl methacrylate, hydroxypropyl acrylate and hydroxypropyl methacrylate; mono- or di-($C_1-C_{10}$ alkyl)aminoalkyl esters of acrylic or methacrylic acid, such as diethylaminoethyl acrylate, diethylaminoethyl methacrylate, methylaminoethyl acrylate, and methylaminoethyl methacrylate; and $C_5-C_{12}$ alkenyloxyalkyl esters of acrylic or methacrylic acid, such as allyloxyethyl acrylate and allyloxyethyl methacrylate.

(b) Vinyl aromatic compounds

Styrene, $\alpha$-methylstyrene, vinyltoluene, p-chlorostyrene and vinylpyridine.

(c) Diolefin compounds butadiene, isoprene and chloroprene.

(d) Amides of acrylic or methacrylic acid

Acrylamide, N-methylol acrylamide and N-butoxymethyl acrylamide.

(e) Other unsaturated monomers

Acrylonitrile, methacrylonitrile and methyl isopropenyl ketone.

These unsaturated monomers may be used singly or in combination with each other.

Of thus unsaturated monomers, the acrylates and methacrylates (a), and the vinyl compounds (b) are preferred, and $C_1-C_{12}$ alkyl esters of acrylic or methacrylic acid, styrene, $\alpha$-methylstyrene and vinyltoluene are especially preferred.

Copolymerization:

According to the present invention, the fatty acid-modified acrylic monomer (A), the $\alpha,\beta$-ethylenically unsaturated carboxylic acid (B) and the unsaturated monomer (C) are copolymerized with each other. The copolymerization can be performed by a method known per se for production of acrylic copolymers, for example by a solution polymerization method, an emulsion polymerization method or a suspension polymerization method.

The proportions of the three components to be copolymerized can be varied according to the properties required of the final aqueous coating composition. The suitable proportions based on the total weight of the three components are 7 to 94% by weight, preferably 15 to 80% by weight, for the fatty acid-modified acrylic monomer (A); 5 to 20% by weight, preferably 7 to 15% by weight, for the $\alpha,\beta$-ethylenically unsaturated carboxylic acid (B); and 1 to 88% by weight, preferably 13 to 78% by weight, for the unsaturated monomer (C).

Advantageously, the copolymerization is carried out by a solution-polymerization method. The three components are reacted in a suitable inert solvent in the presence of a polymerization catalyst as a reaction temperature of usually about 0° to about 180° C., preferably about 40° to about 170° C., for a period of about 1 to about 20 hours, preferably about 6 to about 10 hours.

The solvent used should desirably be capable of dissolving the resulting copolymer and mixing with water so that gellation does not occur during the copolymerization reaction. Solvents which need not to be removed after copolymerization, but can be used as such in preparing a final aqueous coating composition are especially suitable. Example of such solvents include Cellosolve-type solvents of the formula HO—CH$_2$CH$_2$—OR$_4$ (in which R$_4$ represents a hydrogen atom or an alkyl group having 1 to 8 carbon atoms), such as ethylene glycol, butyl Cellosolve and ethyl Cello-solve;

carbitol-type solvents of the formula HO—CH$_2$CH$_2$—OCH$_2$CH$_2$—OR$_4$ (in which R$_4$ is as defined above), such as diethylene glycol, methyl carbitol and butyl carbitol; glyme-type solvents of the formula R$_5$O—CH$_2$CH$_2$—OR$_6$ (in which R$_5$ and R$_6$ each represent an alkyl group having 1 to 3 carbon atoms), such as ethylene glycol dimethyl ether; diglyme-type solvents of the formula R$_5$O—CH$_2$CH$_2$—OCH$_2$—CH$_2$OR$_6$ (in which R$_5$ and R$_6$ are as defined above), such as diethylene glycol dimethyl ether; Cellosolve acetate-type solvents of the formula R$_7$O—CH$_2$CH$_2$OCH—CH$_3$ (in which R$_7$ represents a hydrogen atom or a methyl or ethyl group), such as ethylene glycol monoacetate and methyl Cellosolve acetate; alcohol-type solvents of the formula R$_8$OH (in which R$_8$ represents an alkyl group having 1 to 4 carbon atoms), such as ethanol and propanol; and other solvents such as diacetone alcohol, dioxane, tetrahydrofuran, acetone, dimethylformamide and 3-methoxy-3-methyl-butanol.

Water-immiscible inert solvents may also be used. Preferably, such a water-immiscible solvent has a boiling point of not more than 250° C. so that it can be easily removed by distillation at atmospheric or reduced pressure after the polymerization reaction. Examples of such water-immiscible solvents include aromatic hydrocarbon of the formula

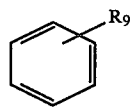

wherein R$_9$ represents a hydrogen atom or an alkyl group having 1 to 4 carbon atoms, or

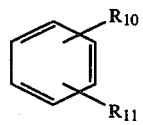

wherein R$_{10}$ and R$_{11}$ each represent an alkyl group having 1 to 4 carbon atoms,
such as toluene and xylene; esters of the formula R$_{12}$—COO—R$_{13}$ (in which R$_{12}$ represents an alkyl group having 1 to 6 carbon atoms, and R$_{13}$ represents an alkyl group having 1 to 6 carbon atoms or a cyclohexyl group), such as ethyl formate, butyl acetate and cyclohexyl acetate; ketones of the formula R$_{14}$R$_{15}$C=O (in which R$_{14}$ and R$_{15}$ each represent an alkyl group having 1 to 8 carbon atoms, or R$_{14}$ and R$_{15}$, taken together, represent an alkylene group having 4 to 12 carbon atoms), such as methyl ethyl ketone and cyclohexanone; ethers of the formula R$_{14}$—O—R$_{15}$ (in which R$_{14}$ and R$_{15}$ are as defined above), such as ethyl ether and hexyl ether; and alcohols of the formula R$_{16}$OH (in which R$_{16}$ represents an alkyl group having 5 to 11 carbon atoms), such as hexanol.

The solvent can be used in an amount of 15 to 90% by weight, preferably 20 to 80% by weight, based on the total weight of the three comonomer components.

The polymerization catalyst may be any of radical initiators which can be used in usual radical polymerizations, for example azo compounds, peroxide compounds, sulfides, sulfines, sulfinic acids, diazo compounds, nitroso compounds, redox systems and ionizing radiation.

Advantageously, the copolymerization reaction is carried out such that the final copolymer obtained has a number average molecular weight of about 500 to about 80000, preferably about 1000 to about 50000.

The copolymer desirably has an acid value of generally 5 to 250, preferably 20 to 150.

The resulting copolymer is rendered water-soluble or water-dispersible as such or after removing the solvent. This can be achieved in a customary manner by neutralizing the carboxyl groups present in the copolymer with a known neutralizing agent. Useful neutralizing agents include organic or inorganic bases such as ammonia, amines, alkali metal hydroxides, alkali metal carbonates, and alkali metal bicarbonates. Examples of the amines are primary, secondary or tertiary alkylamines, primary, secondary or tertiary alkanolamines, and cycloalkylamines. Examples of the alkali metal hydroxides are potassium hydroxide and sodium hydroxide. Examples of the alkali metal carbonates or bicarbonates are potassium carbonate, sodium carbonate and sodium bicarbonate. Potassium hydroxide and sodium hydroxide are especially preferred.

The neutralization treatment can be easily performed in a customary manner by adding the neutralizing agent or its aqueous solution to the resulting copolymer or its solution. The amount of the neutralizing agent used is generally 0.1 to 2.0 equivalents, preferably 0.3 to 1.0 equivalent, based on the carboxyl groups in the copolymer.

The resin [I] which has thus been rendered water-soluble or water-dispersible is used directly as one film-forming component in the aqueous coating composition of this invention. The content of the resin [I] in the aqueous coating composition is not critical. Generally, it is used in a concentration of 5 to 90% by weight, preferably 10 to 60% by weight.

Vinyl polymer emulsion [II]

The vinyl polymer emulsion [II] as the other component of the aqueous coating composition of this invention is obtained by emulsion-polymerization of an unsaturated vinyl monomer in the presence of a water-soluble oxidation-curable resin as a dispersion stabilizer.

Water-soluble oxidation-curable resin

The "water-soluble oxidation-curable resin" used as a dispersion stabilizer in this invention generally denotes a water-soluble resin of the type having in the molecule an atomic grouping capable of being oxidation-curable, which is composed mainly of a maleinized polydiene, or an optionally maleinized resin modified with an oxidation-curable oil or drying oil fatty acid or semidrying oil fatty acid and which has the property of being oxidized rapidly at room temperature in the air to cure to a film having high durability. Suitable water-soluble oxidation-curable resins are those which have a number average molecular weight of generally about 500 to about 50000, preferably about 800 to about 15000, and an acid value of generally about 30 to about 350, preferably about 50 to about 200. Known water-soluble oxidation-curable resins may be used, and typical examples are shown below.

(i) Maleinized polydienes

Products obtained by maleinizing homopolymers or copolymers (preferably containing at least 40% by weight of diene units) of diene compounds having 4 to 8 carbon atoms with maleic acid or maleic anhydride. Suitable maleinized polydienes are maleinized polybutadiene and butadiene copolymers. Maleinized polybutadiene or maleinized butadiene copolymers containing at least 20% by weight of a 1,2-vinyl structure are preferred.

Examples of the diene compounds that can be used for production of the maleinized polydienes are butadiene, isoprene, chloroprene and cyclopentadiene.

To produce the copolymers of diene compounds, vinyl monomers normally used in the art, such as styrene, α-methylstyrene, vinyltoluene, acrylic esters and methacrylic esters, may be used as a comonomer to be copolymerized with the diene compounds. Depending upon the purpose of use, the polydienes and diene copolymers may be modified by modifying means such as partial hydrogenation or cyclization.

(ii) Maleinized fatty acid-modified alkyl resins

Products obtained by modifying alkyd resins prepared in a customary manner from a polyhydric alcohol component such as ethylene glycol, propylene glycol, diethylene glycol, butylene glycol, glycerol, trimethylolethane, trimethylolpropane, pentaerythritol and sorbitol and a polybasic acid component such as phthalic anhydride, isophthalic acid, trimellitic acid, tetrahydrophthalic anhydride, succinic acid, adipic acid and sebacic acid, with drying oil fatty acids or semidrying oil fatty acids of the type exemplified with regard to the fatty acid-modified acrylic monomer (A), and maleinizing the resulting fatty acid-modified alkyd resins having an oil length of generally at least 20, preferably at least 40, in a customary manner.

(iii) Maleinized fatty acid-modified epoxy resins

Products obtained by addition reaction of drying oil fatty acids and/or semidrying oil fatty acids of the types described above with epoxy resins prepared by the reaction of, for example, bisphenol A with epichlorohydrin or β-methylepichlorohydrin, and maleinizing the resulting fatty acid-modified epoxy resins having an oil length of generally at least 20, preferably at least 40.

(iv) Fatty acid-modified acrylic resins

Copolymers having an oil length of generally at least 5, preferably at least 20, obtained by reacting glycidyl-containing acrylic monomers (e.g., glycidyl acrylate, or glycidyl methacrylate) or hydroxyl-containing acrylic monomers (e.g., 2-hydroxyethyl acrylate, 2-hydroxypropyl acrylate, 2-hydroxyethyl methacrylate, 2-hydroxypropyl methacrylate) with drying oil fatty acids or semidrying oil fatty acid of the above-exemplified types, and copolymerizing the resulting fatty acid-modified monomers with the same α,β-ethylenically unsaturated carboxylic acids as described hereinabove (e.g., acrylic acid, methacrylic acid, itaconic acid, maleic acid, or fumaric acid) and if required other unsaturated vinyl monomers (e.g., alkyl acrylates or methacrylates such as methyl acrylate, ethyl acrylate, methyl methacrylate or ethyl methacrylate and styrene). It is also possible to form an acrylic copolymer using a glycidyl-containing acrylic monomer or hydroxyl-containing acrylic monomer not modified with a fatty acid, and then introduce a drying oil or semidrying oil fatty acid group into the copolymer.

(v) Maleinized fatty acid-modified acrylic resins

Products obtained by maleinizing the fatty acid-modified acrylic resins described in section (iv) above in a customary manner. In view of the need for maleinization, the fatty acid-modified acrylic resins should have an oil length of at least 20, preferably at least 40. The α,β-ethylenically unsaturated carboxylic acid may not always be contained as a constituent of the acrylic resin.

(vi) Maleinized oils, maleinized stand oils and maleinized boil oils

These are usually known, and those prepared by using linseed oil and soybean oil are preferred.

(vii) Maleinized fatty acid-modified vinyl resins

Products obtained by reacting a styrene-allyl alcohol copolymer with drying oil or semidrying oil fatty acids of the above-exemplified types, and maleinizing the resulting products.

(viii) Water-soluble alkyd resins, and fatty acid-modified water-soluble epoxy resins If required, these water-soluble oxidation-curable resins may be modified by esterification, amidation, grafting, etc. prior to use.

The water-soluble oxidation-curable resin may be subjected to neutralization treatment using a known neutralizing agent such as amines and ammonia, and if desired, formed into an aqueous solution using a water-soluble organic solvent such as a Cellosolve-type solvent and alcohol-type solvent.

By radical polymerization of an unsaturated vinyl monomer in an aqueous solution of the water-soluble oxidation-curable resin, the vinyl polymer emulsion [II] as the other film-forming component of the aqueous coating composition of this invention can be obtained.

Unsaturated vinyl monomer

The unsaturated vinyl monomer used in the preparation of the vinyl polymer emulsion preferably is non-hydrophilic or has a low degree of hydrophilicity because an emulsion is generally difficult to synthesize from unsaturated vinyl monomers having strong hydrophilicity. Typical examples of the unsaturated vinyl monomers are given below.

(a) Vinyl aromatic compounds

Styrene, α-methylstyrene, and vinyltoluene.

(b) Acrylic or methacrylic acid esters $C_1$–$C_{26}$ alkyl esters of acrylic or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate, addition condensation products between glycidyl acrylate or glycidyl methacrylate and carboxyl-containing compounds having 2 to 26 carbon atoms such as acetic acid, propionic acid, oleic acid, stearic acid or lauric acid; $C_2$–$C_{12}$ alkoxyalkyl esters of acrylic or methacrylic acid such as methoxybutyl acrylate, methoxybutyl methacrylate, methoxyethyl acrylate, methoxyethyl methacrylate, ethoxybutyl acrylate and ethoxybutyl methacrylate, alkenyl esters of acrylic or methacrylic acid such as allyl acrylate and allyl methacrylate; and condensation products between $C_2$–$C_8$ hydroxyalkyl esters of acrylic or methacrylic acid such as hydroxyethyl acrylate, hydroxyethyl methacrylate, hydroxypropyl acrylate and hydroxypropyl methacrylate and carboxyl-containing compounds having 2 to 26 carbon atoms.

(c) Diolefin compounds

Diolefins having 2 to 8 carbon atoms such as butadiene, isoprene and chloroprene.

(d) Other monomers

Vinyl acetate, and Veova monomer (tradename for a product of Shell Chemical Co.).

The vinyl aromatic compounds (a) and the acrylate or methacrylate (b) (especially $C_1$–$C_{12}$ alkyl esters) are preferred in this invention as the unsaturated vinyl monomer.

The unsaturated vinyl monomer is selected according to the properties required of an aqueous coating composition as a final product. These unsaturated vinyl monomers may be used singly or in combination with each other. Not more than 50% by weight, preferably not more than 30% by weight, of the unsaturated vinyl monomer may be replaced by a hydrophilic unsaturated vinyl monomer. Examples of the hydrophilic unsaturated vinyl monomers that can be used include $C_2$–$C_8$ hydroxyalkyl esters of acrylic or methacrylic acid such as 2-hydroxyethyl acrylate, 2-hydroxyethyl methacrylate, 2-hydroxypropyl acrylate and 2-hydroxypropyl methacrylate; acrylonitrile and methacrylonitrile; acrylic acid and methacrylic acid; glycidyl acrylate and glycidyl methacrylate; acrylamide or methacrylamide which is optionally N- or N,N-mono- or di-substituted, such as acrylamide and N-n-butoxymethyl acrylamide; and vinylpyridine. These hydrophilic monomers may be used singly or in combination with each other.

Polymerization

Radical polymerization of the unsaturated vinyl monomer in the presence of the oxidation-curable resin is effected by using a known procedure (see, for example, H. Warson, "The Application of Synthetic Resin Emulsion", 1972, Ernest Benn Limited, London). For example, the polymerization is carried out in the presence of the aforesaid dispersion stabilizer and if desired, a polymerization initiator (for example, azo compounds, peroxides, etc. used in the production of the resin [I]) at a temperature above the freezing point to below the boiling point of water while stirring the polymerization system or allowing it to stand. Water and a mixture of water and a water-miscible organic solvent (such as an alcohol, Cellosolve, carbitol, ether, diglyme or glycol) may be used in the above emulsion polymerization as a reaction medium.

The amount of the water-soluble acid-curable resin used as the dispersion stabilizer is such that its acid value with respect to the total solids content of the entire solids in the resulting vinyl polymer emulsion becomes about 3 to 150, preferably about 10 to 50. The acid value with respect to the total solids content is calculated from the following equation.

$$\text{Acid value} = A \times \frac{C}{B}$$

wherein A is the acid value of the water-soluble oxidation-curable resin, B is the total weight (g) of the water-soluble oxidation-curable resin and the unsaturated vinyl monomer incorporated into the polymerization system, and C is the weight (g) of the water-soluble oxidation-curable resin.

When a free unsaturated carboxylic acid such as acrylic acid or methacrylic acid is used as the unsaturated vinyl monomer, the acid value of this free acid is excluded from the calculation.

The amount of the unsaturated vinyl monomer used in the polymerization is not critical, and may be varied widely according to the properties of the desired polymer emulsion. Advantageously, it is used in an amount of generally 5 to 95% by weight, preferably 7 to 85% by weight, based on the total solids content of the resulting polymer emulsion.

The resulting polymer emulsion may comprise particles having a particle diameter of generally not more than 1 micron, preferably not more than 0.5 micron. The emulsion has an acid value, with respect to the total solids content, of about 3 to about 150, preferably about 10 to about 50, and may have a solids content of 15 to 65% by weight, preferably 20 to 55% by weight.

Aqueous coating composition

The aqueous coating composition of this invention comprises as main components [I] a water-soluble or water-dispersible product of a resin obtained by copolymerizing (A) the fatty acid-modified acrylic monomer, (B) the $\alpha,\beta$-unsaturated carboxylic acid and (C) the unsaturated monomer having Q value in the Q-e theory of at least 0.1, and [II] the vinyl polymer emulsion. The mixing ratio between the components [I] and [II] is not strictly limited. Generally, the weight ratio of [I] to [II], in terms of the resin solids (the emulsion [II] contains the dispersion stabilizer), is from 99.7/0.3 to 0.3/99.7, preferably from 90/10 to 10/90. Mixing of the two components can be effected in a known manner, for example, by adding the component [II] to an aqueous solution or dispersion of the component [I], and mixing them with stirring.

In the final aqueous coating composition, the contents of the components [I] and [II] are not critical, and can be varied widely according to the types of these compounds or the use of the final composition.

As required, the resulting aqueous coating composition may contain at least one additive such as extender pigments, coloring pigments, dryers (e.g., cobalt naphthenate or lead naphthenate), rustproofing agents, ultraviolet absorbers, surface-active agents, antiseptices, etc. Addition of dryers can greatly improve the drying property of a coated film prepared from the aqueous coating composition.

The aqueous coating composition of this invention described hereinabove has superior storage stability over a long period of time, and coated films prepared from it are fast-drying and have superior water resistance, weatherability, corrosion resistance, alkali resistance, mechanical strength, salt water resistance, solvent resistance, chemical resistance, and gloss.

If required, the aqueous coating composition of this invention may be diluted with water. Coated films formed from the coating composition fully cure at room temperature. If desired, the curing may be effected at an elevated temperature.

Since the aqueous coating composition of this invention cures sufficiently at ordinary temperature, it can be used as a versatile paint for coating furniture, buildings, etc. It is also useful as an industrial paint in coating machinery because it also cures at an elevated temperature.

The following Examples illustrate the present invention more specifically. All parts and percentages in these examples are by weight unless otherwise specified.

Production of Water-Soluble Copolymer

Production Example 1

(1-a) The following ingredients were put into a reactor, and with stirring, the mixture was heated to 150° C.

| | |
|---|---|
| Soybean oil fatty acid | 2240 parts |
| Hydroquinone | 1.3 parts |

| Methyl sulfate | 2.6 parts |
| --- | --- |
| n-Heptane | 144 parts |

A mixture of the following ingredients was added dropwise to the mixture in the reactor at 150° C. over the course of 2 hours.

| 2-Hydroxyethyl methacrylate | 1300 parts |
| --- | --- |
| Hydroquinone | 2.6 parts |
| Methyl sulfate | 7.6 parts |
| Toluene | 234 parts |

The water of condensation was removed from the reaction system, and the reaction was carried out at 150° C. for 6.5 hours until the reaction product had an acid value of 7.4. When the acid value reached 7.4, the pressure of the inside of the reactor was reduced, and the solvent was distilled off under reduced pressure until the amount of the residue on heating became 95%. A fatty acid-modified monomer having a Gardner viscosity of F-G was obtained.

(1-b) A reactor was charged with 1000 parts of n-butyl Cellosolve, and it was heated to 120° C. A mixture of the following ingredients was added dropwise over the course of 2 hours. The reaction was carried out while introducing nitrogen.

| Fatty acid-modified monomer | |
| --- | --- |
| obtained in (1-a) above | 854 parts |
| Styrene | 444 parts |
| n-Butyl methacrylate | 444 parts |
| Acrylic acid | 258 parts |
| Azobisdimethylvaleronitrile | 50 parts |
| Azobisisobutyronitrile | 40 parts |

The reaction temperature was maintained at 120° C., and while the reaction solution was being stirred, the above mixture was added dropwise. One hour after the addition, 16 parts of azobisisobutyronitrile was added to the reaction solution. The reaction solution was then maintained at 120° C. for 2 hours. After the reaction, the unreacted monomers and n-butyl Cellosolve were distilled off under reduced pressure until the amount of the residue on heating became 75%. Thus, a copolymer having a resin acid value of 90.6 and a Gardner viscosity (determined for a 60% n-butyl Cellosolve solution) of $Z_4^-$ was obtained. The copolymer was then neutralized with about 0.7 equivalent, based on the carboxyl groups of the copolymer, of triethylamine and about 0.2 equivalent, based on the carboxyl groups, of 28% aqueous ammonia to afford a water-soluble copolymer (A).

Production Example 2

(2-a) Esterification reaction was carried out in the same way as in Production Example 1, (1-a) except that linseed oil fatty acid was used instead of the soybean oil fatty acid. When the esterification reaction was carried out at 150° C. for 8 hours, the acid value of the reaction product became 7.3. Then, the inside pressure of the reactor was reduced, and the solvent was distilled off under reduced pressure until the amount of the residue on heating became 95%. Thus, a fatty acid-modified monomer having a Gardner viscosity of A was obtained.

(2-b) Five hundred (500) parts of n-butyl Cellosolve was put into a reactor, and heated to 120° C. Then, a mixture of the following ingredients was added dropwise over the course of about 2 hours. The reaction was carried out while introducing nitrogen.

| Fatty acid-modified monomer | |
| --- | --- |
| obtained in (2-a) above | 427 parts |
| Styrene | 222 parts |
| n-Butyl methacrylate | 222 parts |
| Acrylic acid | 129 parts |
| Azobisdimethylvaleronitrile | 25 parts |
| Azobisisobutyronitrile | 20 parts |

The reaction temperature was maintained at 120° C., and while the reaction solution was being stirred, the above mixture was added dropwise. One hour after the addition, 8 parts of azobisisobutyronitrile was added to the reaction solution. Two hours later, 8 parts of azobisisobutyronitrile was again added to the reaction solution. Then, the reaction solution was maintained at 120° C. for 2 hours. After the reaction, the unreacted monomers and n-butyl Cellosolve was distilled off under reduced pressure until the amount of the residue on heating became 75%. A copolymer having a resin acid value of 88.3 and a Gardner viscosity (determined for a 60% n-butyl Cellosolve solution) of $Z^+$ was obtained.

The resulting copolymer was neutralized in the same way as in Production Example 1 to afford a water-soluble copolymer (B).

Production Example 3

(3-a) Esterification reaction was carried out in the same way as in Production Example 1, (1-a) except that safflower oil fatty acid was used instead of the soybean oil fatty acid. The reaction was carried out at 150° C. for 6.5 hours until the acid value of the resulting resin product became 6.4. When the acid value of the resin became 6.4, the inside pressure of the reactor was reduced, and the solvent was distilled off under reduced pressure until the amount of the residue on heating became 95%. A fatty acid-modified monomer having a Gardner viscosity of G-H was obtained.

(3-b) Four hundred (400) parts of n-butyl Cellosolve was put into a reactor, and heated to 120° C. A mixture of the following ingredients was added dropwise over the course of 2 hours. The reaction was carried out while introducing nitrogen.

| Fatty acid-modified monomer | |
| --- | --- |
| obtained in (3-a) | 399 parts |
| Styrene | 159 parts |
| n-Butyl methacrylate | 159 parts |
| Acrylic acid | 103 parts |
| Azobisdimethylvaleronitrile | 36 parts |

The reaction temperature was maintained at 120° C., and while the reaction solution was being stirred, the above mixture was added dropwise. One hour after the addition, 6.4 parts of azobisisobutyronitrile was added to the reaction solution. Two hours later, 6.4 parts of azobisisobutyronitrile was again added, and the mixture was maintained at 120° C. for 2 hours. After the reaction, the unreacted monomers and n-butyl Cellosolve were distilled off under reduced pressure until the amount of the residue on heating became 75%. A copolymer having a resin acid value of 86.4 and a Gardner viscosity (determined for a 60% n-butyl Cellosolve solution) of $Z_3$–$Z_4$ was obtained.

The resulting copolymer was neutralized in the same way as in Production Example 1 to afford a water-soluble copolymer (C).

Production Example 4

(4-a) The following ingredients were put into a reactor, and with stirring, they were heated to 150° C.

| Tall oil fatty acid | 2240 parts |
|---|---|
| Hydroquinone | 1.2 parts |
| Methyl sulfate | 2.5 parts |
| n-Heptane | 138 parts |

Then, a mixture of the following ingredients was added dropwise to the mixture in the reactor at 150° C. over the course of 2.5 hours.

| 2-Hydroxyethyl acrylate | 1160 parts |
|---|---|
| Hydroquinone | 2.5 parts |
| Methyl sulfate | 7.3 parts |
| Toluene | 225 parts |

The water of condensation was removed out of the reaction system, and the reaction was carried out at 150° C. for 6 hours until the acid value of the reaction product became 6.4. When the acid value reached 6.4, the inside pressure of the reactor was reduced, and the solvent was distilled off under reduced pressure until the amount of the residue on heating became 95%. A fatty acid-modified monomer having a Gardner viscosity of C was obtained.

(4-b) One thousand (1000) parts of n-butyl Cellosolve was put into a reactor and heated to 120° C. A mixture of the following ingredients was added dropwise over the course of 2 hours. The reaction was carried out while introducing nitrogen.

| Fatty acid-modified monomer obtained in (4-a) above | 854 parts |
|---|---|
| Ethyl acrylate | 419 parts |
| Methyl methacrylate | 209 parts |
| 2-Ethylhexyl methacrylate | 210 parts |
| Methacrylic acid | 308 parts |
| Azobisdimethylvaleronitrile | 50 parts |

The reaction temperature was maintained at 120° C., and while the reaction solution was being stirred, the above mixture was added dropwise. One hour after the addition, 16 parts of azobisisobutyronitrile was added to the reaction solution. Two hours later, 16 parts of azobisisobutyronitrile was further added. Then, the reaction solution was maintained at 120° C. for 2 hours. After the reaction, the unreacted monomers and n-butyl Cellosolve were distilled off under reduced pressure until the amount of the residue on heating became 75%. A copolymer having a resin acid value of 90.0 and a Gardner viscosity (determined for a 60% n-butyl Cellosolve solution) of $Z_4$ was obtained. The resulting copolymer was neutralized with about 0.7 equivalent of triethylamine and about 0.2 equivalent of 28% aqueous ammonia based on the carboxyl groups in the copolymer. Thus, a water-soluble copolymer (D) was obtained.

Production Example 5

(5-a) The following ingredients were put into a reactor.

| Safflower oil fatty acid | 236 parts |
|---|---|
| Glycidyl methacrylate | 119 parts |
| Hydroquinone | 0.4 part |
| Tetraethyl ammonium bromide | 0.2 part |

The reaction was carried out at 140° to 150° C. with stirring to afford an addition reaction product. The addition reaction between the epoxy group and the carboxyl group was traced by measuring the amount of the residual carboxyl groups. A period of about 4 hours was required until the reaction was completed.

(5-a) Fifty (50) parts of n-butyl Cellosolve was put into a reactor, and heated to 120° C. A mixture of the following ingredients was added dropwise over the course of about 2 hours. The reaction was carried out while introducing nitrogen.

| The addition reaction product obtained in (5-a) | 40 parts |
|---|---|
| Styrene | 23 parts |
| n-Butyl methacrylate | 24 parts |
| Acrylic acid | 13 parts |
| Azobisdimethylvaleronitrile | 5 parts |

The reaction temperature was maintained at 120° C., and while the reaction solution was stirred, the above mixture was added dropwise. One hour after the addition, 0.8 part of azobisisobutyronitrile was added to the reaction solution. Two hours later, 0.8 part of azobisisobutyronitrile was again added to the reaction solution. The reaction solution was then maintained at 120° C. for 2 hours. After the reaction, the unreacted monomers and n-butyl Cellosolve was distilled off under reduced pressure until the amount of the residue on heating became 75%. A copolymer having a resin acid value of 85.0 and a Gardner viscosity (determined for a 60% n-butyl Cellosolve solution) of $Z_3$–$Z_4$ was obtained.

The resulting copolymer was neutralized in the same way as in Production Example 1 to afford a water-soluble copolymer (E).

Production of Polymer Emulsion

Production Example A (A-1) A reactor was charged with 660 parts of 1,2-vinyl type polybutadiene having a number average molecular weight of about 3000, 137.5 parts of maleic anhydride, 552 parts of cyclohexyl acetate and 6 parts of dimethyl formamide, and they were heated at 180° to 185° C. for 7 hours. The reaction mixture was distilled under reduced pressure to remove the unreacted maleic anhydride and the solvent. Then, 20 parts of water was added, and the mixture was subjected to a ring-opening reaction. Then, n-butyl Cellosolve was added to afford a water-soluble oxidation-curable resin having a solids content of 77% and an acid value of 109 was obtained.

(A-2) The following ingredients were put into a reactor, and well dissolved.

| Water-soluble oxidation-curable resin obtained in (A-1) above | 208 parts |
|---|---|
| Tap water | 769 parts |

| | |
|---|---|
| 28% Aqueous ammonia | 18 parts |
| n-Butyl Cellosolve | 8 parts |

Then, 414 parts of n-butyl methacrylate was added, and a solution of 1 part of ammonium persulfate in 20 parts of water was added. They were reacted at 80° C. for 2 hours. Thus, a polymer emulsion having a polymerization conversion of 100% was obtained. This polymer emulsion is designated a polymer emulsion (1).

Production Example B (B-1) A reactor was charged with 436 parts of phthalic anhydride, 528 parts of pentaerythritol, 1624 parts of linseed oil fatty acid, 412 parts of benzoic acid, 150 parts of xylene and 5.6 parts of dibutyltin oxide, and they were reacted at 240° C. for 6 hours in the presence of nitrogen to afford an alkyd resin having an acid value of 5.9. Maleic anhydride (285 parts) was added to the resulting alkyd resin, and they were reacted at 200° C. for 3 hours in the presence of nitrogen. After the reaction, the reaction mixture was distilled off under reduced pressure to remove the unreacted maleic anhydride and xylene from it. Then, 70 parts of water was added, and the mixture was subjected to a ring-opening reaction. To the resulting product was added n-butyl Cellosolve to afford a water-soluble oxidation-curable resin having a solids content of 77% and an acid value of 83.1.

(B-2) The following ingredients were put into a reactor and well dissolved.

| | |
|---|---|
| Water-soluble oxidation-curable resin obtained in (B-1) | 208 parts |
| Tap water | 773 parts |
| 28% Aqueous ammonia | 14 parts |
| n-Butyl Cellosolve | 8 parts |

Then, 414 parts of n-butyl methacrylate was added, and further a solution of 1 part of ammonium persulfate in 20 parts of water was added. The reaction was carried out at 80° C. for 2 hours. Thus, a polymer emulsion having a polymerization conversion of 100% was obtained. This product was designated a polymer emulsion (2).

Production Example C (C-1) A mixture of the following ingredients was heated at 230° C. for 9 hours to esterify and dehydrate it to afford an oxidation-curable resin having an acid value of 5.3.

| | |
|---|---|
| Styrene/allyl alcohol copolymer (molecular weight 1140, OH group content 7.5% by weight) | 547 parts |
| Linseed oil fatty acid | 635 parts |
| Xylene | 61 parts |
| Dibutyltin oxide | 1.1 parts |

Maleic anhydride (144 parts) was added to the resulting resin, and the mixture was reacted at 180° to 200° C. for 3 hours. After the reaction, the reaction mixture was distilled off under reduced pressure to remove the unreacted maleic anhydride and xylene from it. Then, 50 parts of water was added, and the mixture was subjected to a ring-opening reaction at 100° C. for 2 hours. Then, n-butyl Cellosolve was added to afford a water-soluble oxidation-curable resin having a solids content of 74% and a resin acid value of 105.

(C-2). The following ingredients were put into a reactor and well dissolved.

| | |
|---|---|
| Water-soluble oxidation-curable resin obtained in (C-1) above | 216 parts |
| Tap water | 758 parts |
| Triethylamine | 29 parts |

Then, 414 parts of a mixture composed of 150 parts of styrene, 254 parts of 2-ethylhexyl methacrylate and 10 parts of 1,6-hexanediol diacrylate was added, and further a solution of 1 part of ammonium persulfate in 20 parts of water was added. They were added at 80° C. for 2 hours to afford a polymer emulsion (3).

Production of Aqueous Coating Composition

EXAMPLE 1

The water-soluble copolymer (A) obtained in Production Example 1 was mixed with the polymer emulsion (1) obtained in Production Example A so that the weight ratio of (A) to (1) in terms of the resin solids became 20:80. Then, 0.126 part, 0.04 part and 0.04 part, per 100 parts of the resin solids, of lead naphthenate, cobalt naphthenate and manganese naphthenate were added as dryers. The mixture was dispersed by a paint conditioner to prepare an aqueous coating composition.

The viscosity of the aqueous coating composition was adjusted with water, and the resulting composition was coated on a mild steel sheet by a bar coater. The coated mild steel sheet was allowed to stand at 20° C. and a humidity of 75% for 5 days to dry the coated film. The resulting dried film was tested for the various properties shown in Table 1. The results are shown in Table 1.

EXAMPLES 2 TO 5 AND COMPARATIVE EXAMPLES 1 AND 2

Aqueous coating compositions were prepared in the same way as in Example 1 using the paint formulations shown in Table 1. The compositions were coated and dried in the same way as in Example 1, and the dried coated films were similarly tested. The results are shown in Table 1.

| | Example 1 | Example 2 | Example 3 | Example 4 | Example 5 | Comparative Example 1 | Comparative Example 2 |
|---|---|---|---|---|---|---|---|
| Paint formulation (*1) | | | | | | | |
| Water-soluble | | | | | | | |
| copolymer (A) | 20 | | | | | | |
| copolymer (B) | | 50 | | | | | |
| copolymer (C) | | | 30 | 20 | | | |

| | Example 1 | Example 2 | Example 3 | Example 4 | Example 5 | Comparative Example 1 | Comparative Example 2 |
|---|---|---|---|---|---|---|---|
| copolymer (D) | | | | | 20 | | |
| copolymer (E) | | | | | | 20 | 20 |
| Polymer emulsion (1) | 80 | 50 | 70 | | | 80 | |
| Polymer emulsion (2) | | | | 80 | | | 80 |
| Polymer emulsion (3) | | | | | 80 | | |
| **Film Properties (*2)** | | | | | | | |
| Film thickness (microns) | 40 | 41 | 46 | 40 | 43 | 48 | 43 |
| Water resistance | | | | | | | |
| Dipped for 6 hrs | No change | No change | No change | No change | No change | No change | No change |
| Dipped for 1 day | No change | No change | No change | No change | No change | Whitened | Blister occured all over |
| Dipped for 3 days | Slightly whitened | Slightly whitened | Slightly whitened | Slightly whitened | Slightly whitened | Blister occurred all over | — |
| Corrosion resistance (mm) | 4.0 | 5.0 | 4.0 | 6.0 | 5.0 | 10.0 | 10.0 |

(*1): The figures show parts by weight of the resin solids. In Examples 2 to 4 and Comparative Examples 1 and 2, the same amounts of the same dryers were added as in Example 1.
(2*): Testing methods for the film properties
Water resistance
The sample was dipped in tap water at 20° C., and the condition of the film surface was examined.
Corrosion resistance
A crosscut reaching the substrate surface was provided in the paint film, and 5% salt water was sprayed onto the paint film surface for 24 hours, and the width of corrosion from the cut portion was measured.

What we claim is:

1. An aqueous coating composition comprising as film-forming components:
   I. a water-soluble or water-dispersible product of a resin (i) obtained by copolymerizing:
   (A) a fatty acid-modified acrylic monomer composed of the reaction product between an unsaturated fatty acid having at least two non-conjugated double bonds and a hydroxyl-containing ester of acrylic or methacrylic acid selected from the group consisting of compounds of the following formulae:

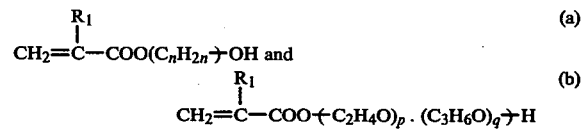

wherein $R_1$ represents a hydrogen atom or a methyl group, n is an integer of 2 to 8, and p and q each represent zero or an integer of 1 to 8 provided that the sum of p and q is 1 to 8,
   (B) an $\alpha,\beta$-ethylenically unsaturated carboxylic acid, and
   (C) an unsaturated monomer having a Q value in the Q-e theory of at least 0.1, and
   II. a vinyl polymer emulsion obtained by polymerizing an unsaturated vinyl monomer selected from the group consisting of vinyl aromatic compounds, acrylic esters, methacrylic esters, diolefin compounds, vinyl acetate and Veova monomer, in the presence of a water-soluble oxidation-curable resin (ii) as a dispersion stabilizer, which is selected from the group consisting of maleinized polydienes, maleinized fatty acid-modified alkyd resins, maleinized fatty acid-modified epoxy resins, fatty acid-modified acrylic resins, maleinized fatty acid-modified acrylic resins, maleinized oils, maleinized stand oils, maleinized boil oils, maleinized fatty acid-modified vinyl resins, water-soluble alkyd resins and fatty acid-modified water-soluble epoxy resins.

2. The composition of claim 1 wherein said unsaturated fatty acid is a linear or branched unsaturated aliphatic monocarboxylic acid.

3. The composition of claim 1 wherein said unsaturated fatty acid has 10 to 24 carbon atoms.

4. The composition of claim 1 wherein said unsaturated fatty acid has an iodine value of at least 80.

5. The composition of claim 1 wherein said unsaturated fatty acid is selected from drying oil fatty acids and semidrying oil fatty acids.

6. The composition of claim 5 wherein said unsaturated fatty acid is selected from the group consisting of safflower oil fatty acid, linseed oil fatty acid, soybean oil fatty acid, sesame oil fatty acid, poppy seed oil fatty acid, perilla oil fatty acid, hemp seed oil fatty acid, grape kernel oil fatty acid, corn oil fatty acid, tall oil fatty acid, sunflower oil fatty acid, cotton seed fatty acid, walnut oil fatty acid and rubber seed oil fatty acid.

7. The composition of claim 1 wherein said unsaturated fatty acid is used in an amount of 5 to 65% by weight based on the weight of the resin.

8. The composition of claim 1 wherein said hydroxyl-containing acrylic or methacrylic ester contains 2 to 24 carbon atoms and one hydroxyl group in the ester residue moiety.

9. The composition of claim 1 wherein said hydroxyl-containing acrylic or methacrylic acid ester is selected from 2-hydroxyethyl acrylate, 2-hydroxyethyl methacrylate, 2-hydroxypropyl acrylate and 2-hydroxypropyl methacrylate.

10. The composition of claim 1 wherein said reaction product is obtained by reacting 1 mole of the unsaturated fatty acid with 0.5 to 1.9 moles of said hydroxyl-containing acrylic or methacrylic ester.

11. The composition of claim 1 wherein said $\alpha,\beta$-ethylenically unsaturated carboxylic acid has 3 to 8 carbon atoms and 1 to 2 carboxyl groups.

12. The composition of claim 11 wherein said $\alpha,\beta$-ethylenically unsaturated carboxylic acid is selected from acrylic acid, methacrylic acid, crotonic acid, itaconic acid, maleic acid, maleic anhydride and fumaric acid.

13. The composition of claim 1 wherein said unsaturated monomer has a Q value of 0.1 to 5.0.

14. The composition of claim 1 wherein said unsaturated monomer is selected from acrylic esters, methacrylic esters and vinyl aromatic compounds.

15. The composition of claim 14 wherein said unsaturated monomer is selected from $C_1$-$C_{18}$ alkyl esters of acrylic acid, $C_1$-$C_{18}$ alkyl esters of methacrylic acid, styrene, α-methylstyrene and vinyltoluene.

16. The composition of claim 1 wherein said resin (i) is a copolymer of 7 to 94% by weight of the fatty acid-modified acrylic monomer (A), 5 to 20% by weight of the α,β-ethylenically unsaturated carboxylic acid (B) and 1 to 88% by weight of the unsaturated monomer (C), based on the total weight of the three components.

17. The composition of claim 16 wherein said resin (i) is a copolymer of 15 to 80% by weight of the fatty acid-modified acrylic monomer (A), 7 to 15% by weight of the α,β-ethylenically unsaturated carboxylic acid (B) and 13 to 78% by weight of the unsaturated monomer (C), based on the total weight of the three components.

18. The composition of claim 1 wherein said resin (i) has a number average molecular weight of about 500 to about 80000.

19. The composition of claim 1 wherein said resin (i) has an acid value of 5 to 250.

20. The composition of claim 1 wherein said resin (i) is rendered water-soluble or water-dispersible by neutralization with an organic or inorganic base.

21. The composition of claim 1 wherein said water-soluble oxidation-curable resin (ii) has a number average molecular weight of about 500 to about 50000 and an acid value of about 20 to about 350.

22. The composition of claim 1 wherein said unsaturated vinyl monomer is selected from vinyl aromatic compounds, acrylic esters and methacrylic esters.

23. The composition of claim 1 wherein said vinyl polymer composition has a particle diameter of not more than 1 micron.

24. The composition of claim 1 wherein said vinyl polymer emulsion has an acid value, with respect to the total solids content, of about 3 to about 150.

25. The composition of claim 1 wherein said vinyl polymer emulsion has a solids content of 15 to 65% by weight.

26. The composition of claim 1 which further comprises at least one additive selected from the group consisting of extended pigments, coloring pigments, dryers, rustproofing agents, ultraviolet absorbers, surface-active agents and antiseptics.

27. An article coated with the aqueous coating composition of claim 1.

* * * * *